May 30, 1944.  M. C. TATE  2,350,261
MEASURING AND INDICATING SYSTEM
Filed March 18, 1940
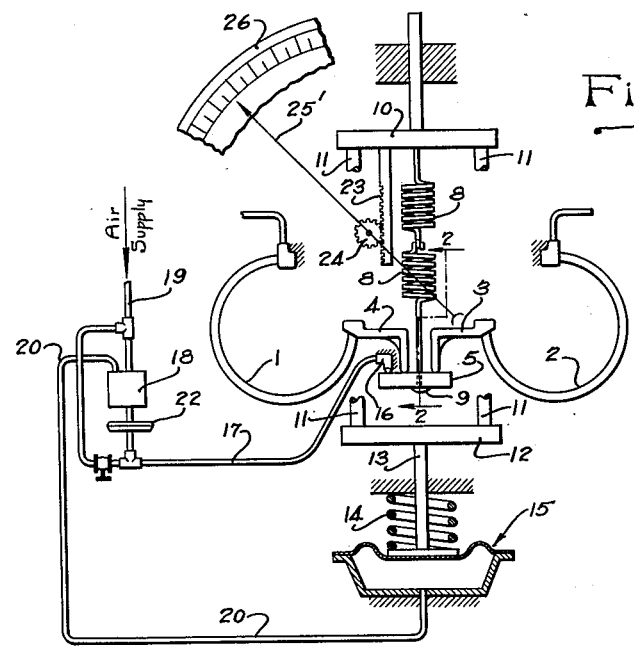
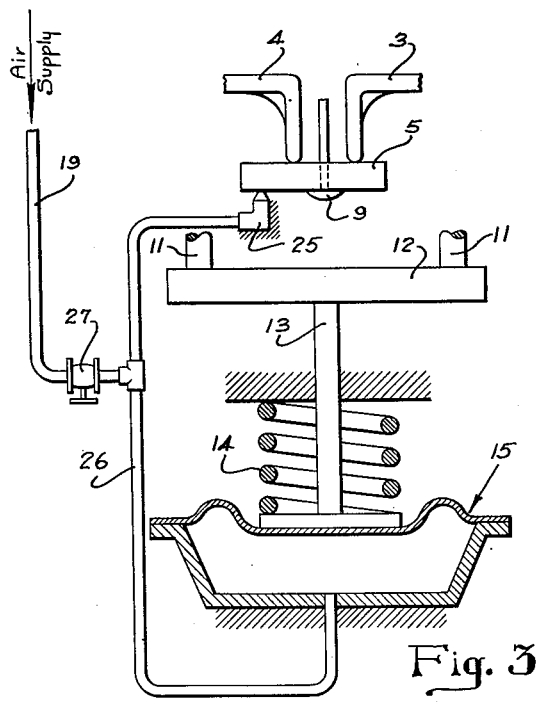
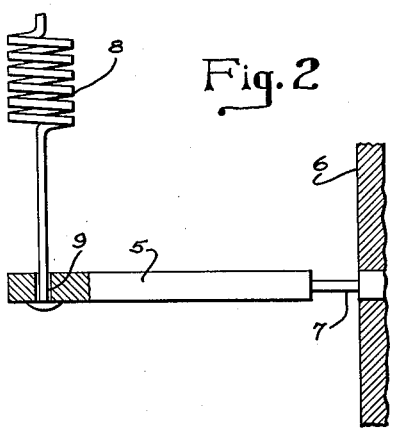
INVENTOR
MALCOLM C. TATE
BY
ATTORNEY Patented May 30, 1944

2,350,261

UNITED STATES PATENT OFFICE 2,350,261

MEASURING AND INDICATING SYSTEM

Malcolm C. Tate, Stamford, Conn., assignor to The Baldwin Locomotive Works, a corporation of Pennsylvania Application March 18, 1940, Serial No. 324,606

2 Claims. (Cl. 265—1)

This invention relates generally to measuring and indicating apparatus and more particularly to improved means for measuring and indicating a total force exerted by a plurality of force responsive elements.

My invention disclosed herein is especially applicable to measuring fluid pressure forces generated in various manners, such for example as in hydraulic cylinders or hydraulic supports, one form of which is illustrated in Emery Patent 1,848,468. These hydraulic cylinders or hydraulic supports may be used for measuring torque or for weighing load which is applied to a structure. In such cases it is desirable to totalize the torque or the entire loading force as the case may be.

It is an object of my invention to provide improved means whereby the force produced or generated at a plurality of sources may be totalized in a manner that is simple, effective and has a high degree of responsiveness, accuracy and sensitivity.

A further object is to provide an improved totalizing system that is adapted to register on a single indicating apparatus.

Another object is to provide an improved totalizing system employing a plurality of force responsive elements so related to each other that the forces of the individual responsive members are cumulative, without any structural interference between the plurality of force responsive devices thereby insuring maximum freedom of action of the individual devices.

A still further object is to provide an improved force totalizing system in which a simple form of spring arrangement may be common to the plurality of force measuring devices.

Other objects and advantages will be more apparent to those skilled in the art from the following description of the accompanying drawing in which:

Fig. 1 is a diagrammatic elevation of my improved totalizing apparatus;

Fig. 2 is a transverse section taken substantially on the line 2—2 of Fig. 1; and Fig. 3 is an enlarged partial diagrammatic view showing a direct air jet-baffle control employed with my improved totalizing system.

In the particular embodiments of the invention such as are disclosed herein merely for the purpose of illustrating certain specific forms among possible others that the invention might take in practice, I have shown in Fig. 1 a plurality of Bourdon tubes, specifically two in number, 1 and 2, although in accordance with the disclosure hereof it will be seen that more could be employed if desired. These Bourdon tubes are supplied with pressure fluid from any suitable source while the free ends of the tubes have arms 3 and 4 in abutting engagement with a baffle plate 5 in the form of a cantilever beam fulcrum whose fixed end is embedded in a suitable stationary member 6. The baffle plate 5 has a reduced transverse section 7 to increase its flexure vertically while insuring lateral rigidity. A set of springs 8, specifically of the well-known iso-elastic type having a straight line stress-strain relation, are freely pivotally connected at their lower end 9 to the baffle plate 5 while their upper end is secured to a frame 10. This frame has side rods 11 and a lower crosshead 12 and a central rod 13 all rigidly connected to each other and biased downwardly by a spring 14 against the upward fluid pressure force of an air servo-motor 15 of any suitable elastic type.

The purpose of the servo-motor 15 is to balance the downward forces of the Bourdon tubes. To accomplish this the servo-motor pressure is controlled by an air jet 16 held preferably in a stationary position and overlying the baffle plate 5 which acts as a baffle for jet 16. The remaining structure will be more apparent when described in conjunction with the mode of operation.

*Operation.*—When the pressure in the Bourdon tubes 1 and 2 increases they simultaneously push downwardly on baffle plate 5. The plate 5 will thereupon move away from jet 16 and permit a greater rate of discharge of jet fluid accompanied by a corresponding reduced pressure in the jet pipe 17. As is fully explained in my copending application Serial No. 61,029, filed January 27, 1936, now Patent No. 2,212,085, the reduced pressure in pipe 17 permits a relay valve 18 to admit an increased supply of pressure from a source 19 to the servo-motor pipe 20 and to servo-motor 15 thereby to raise frame 10—13 against the action of spring 14. The raising of this frame pulls upwardly on springs 8 thereby moving baffle plate 5 upwardly until the baffle action is substantially restored to its initial position with respect to jet 16. This upward movement of the baffle plate 5 also causes the arms 3 and 4 to move upwardly thereby substantially returning the free ends of the Bourdon tubes 1 and 2 to their original position. When the predetermined jet-baffle relation is re-established the system comes into balance by reason of the restriction of the jet orifice thereby increasing the pressure in pipe 17 to cause a relay valve bellows 22 to reduce flow of fluid from source 19 to the servo-motor. The foregoing movements of the tubes and cantilever baffle 5 are very minute and are continuously occurring as the pressure in the Bourdon tubes increases or decreases. As the pressure in the Bourdon tubes increases, say from no load up to full load, the servo-motor 15 and frame 10—13 will move upwardly for a distance that is necessary to stretch spring 8 in transmitting the necessary force to baffle plate 5 in order to maintain a continuous balance between the jet and baffle. In other words, for each increment of relative movement between the jet and baffle in response to a given force in the tubes 1 and 2, the servo-motor 15 and frame 10—13 will have to move a greater distance to restore the baffle plate 5 to its original position by reason of the spring 8 being interposed between the baffle plate and frame. Hence, it is seen that springs of different capacities substituted for the spring 8 will permit the frame 10 to have different extents of multiplied movement in response to a given increment of movement of the baffle plate 5. To indicate the movement and therefore the total force of tubes 1 and 2 a rack 23 is connected to frame 10 to operate a pinion 24 rotatable about a stationary axis. A usual pointer 25' is therefore rotated over a suitably graduated circular dial diagrammatically indicated at 26. Each Bourdon tube may be calibrated by suitably determining or adjusting the horizontal length of arms 3 and 4.

*Fig. 3 modification.*—In the modification of Fig. 3 a simple direct acting jet-baffle control is employed for the servo-motor 15. In this case the relay valve 18 and control 22 is eliminated and the jet 25 is placed beneath the baffle plate 5. Hence, upon expansion of Bourdon tubes 1 and 2 the baffle plate 5 is moved downwardly toward jet 25 thereby restricting the rate of discharge from the jet and accordingly increasing the pressure in line 26 and in the servo-motor 15. The servo-motor is thereupon expanded to raise frame 10—13 and accordingly elongate springs 8 to move baffle plate 5 upwardly substantially to restore the baffle plate to its original relation with respect to jet 25 when the system is again in balance. Conversely, when the Bourdon tubes have an initial contraction the baffle plate 5 moves away from jet 25 thereby allowing the servo-motor pressure to drop thereby causing spring 14 to move the frame 10—13 downwardly accompanied by a contraction of spring 8 and restoration of the baffle plate 5 to its predetermined relation to the jet 25 whereupon the system is again in balance. A supply of air from a pipe 19 passes through a suitable pressure reducing valve 27 to insure a uniform rate of air supply to the jet.

From the foregoing disclosure, it is seen that I have provided a very effective system for measuring the effects of a plurality of simultaneously operative condition responsive elements, totalizing the effects and indicating the total result in a single reading. Fluid pressure is shown herein for purposes of illustrating a specific condition to which the elements are responsive. The combination of structural elements and their functional relationship and cooperation is conducive to a very high degree of sensitivity, accuracy and responsiveness, the elements of the combination being of such a nature and so related as to provide a sturdy device adapted to have long life with minimum maintenance.

It will of course be understood that various changes in details of construction and arrangement of parts may be made by those skilled in the art without departing from the spirit of the invention as set forth in the appended claims.

I claim:

1. In combination, a plurality of movable force responsive elements, means for balancing the total force of said responsive elements including a servo-motor and extensible means connected to said motor and commonly operatively connected to all of said responsive elements, means responsive to variations of the totalized force of said responsive elements for controlling said servo-motor so as to maintain said responsive elements in a substantially constant position throughout operation, said extensible means allowing said servo-motor to have a relatively large extent of movement for each increment of combined movement of the responsive elements, and mechanism operated by said servo-motor and having the relatively large movement thereof, the operative connections between said force responsive elements and said extensible means including a flexure plate adapted to have relatively free movement in the direction of force of the responsive elements and having one portion fixed so as to be relatively rigid in a direction laterally of said force.

2. In combination, a plurality of movable force responsive elements, means for balancing the total force of said responsive elements including a servo-motor and extensible means connected to said motor and commonly operatively connected to all of said responsive elements, means responsive to variations of the totalized force of said responsive elements for controlling said servo-motor so as to maintain said responsive elements in a substantially constant position throughout operation, said extensible means allowing said servo-motor to have a relatively large extent of movement for each increment of combined movement of the responsive elements, and mechanism operated by said servo-motor and having the relatively large movement thereof, the operative connections between said force responsive elements and said extensible means including a flexure plate adapted to have relatively free movement in the direction of force of the responsive elements and to be relatively rigid in a direction laterally of said force, said means for controlling said servo-motor including an air jet and baffle controlled by said flexure plate in accordance with movement thereof in response to the totalized force of said responsive elements.

MALCOLM C. TATE.